United States Patent
Min et al.

(10) Patent No.: US 8,274,934 B2
(45) Date of Patent: Sep. 25, 2012

(54) METHOD AND SYSTEM FOR TRANSMITTING/RECEIVING DATA IN COMMUNICATION SYSTEM

(75) Inventors: Chan-Ho Min, Yongin-si (KR); Ok-Seon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 12/217,018

(22) Filed: Jul. 1, 2008

(65) Prior Publication Data

US 2009/0022101 A1   Jan. 22, 2009

(30) Foreign Application Priority Data

Jul. 16, 2007   (KR) .................. 10-2007-0071093

(51) Int. Cl.
*H04W 4/00* (2009.01)
*H04W 72/00* (2009.01)

(52) U.S. Cl. .............. 370/329; 370/395.41; 370/468; 455/452.1; 455/453

(58) Field of Classification Search .............. 370/329, 370/395.41, 468; 455/452.1, 453
See application file for complete search history.

(56) References Cited

U.S. PATENT DOCUMENTS

| | | | |
|---|---|---|---|
| 6,640,268 B1 | 10/2003 | Kumar | |
| 7,486,928 B2 * | 2/2009 | Izumikawa et al. | 455/11.1 |
| 7,529,188 B2 * | 5/2009 | Saha et al. | 370/230.1 |
| 7,742,448 B2 * | 6/2010 | Ramachandran et al. | 370/329 |
| 7,768,920 B2 * | 8/2010 | Goshen et al. | 370/235 |
| 7,813,754 B2 * | 10/2010 | Usuda et al. | 455/522 |
| 7,843,832 B2 * | 11/2010 | Choi et al. | 370/235.1 |
| 7,860,056 B2 * | 12/2010 | Kwun et al. | 370/329 |
| 7,873,002 B2 * | 1/2011 | Cai | 370/329 |
| 7,894,388 B2 * | 2/2011 | Visotsky | 370/329 |
| 7,916,683 B2 * | 3/2011 | Kwon et al. | 370/322 |
| 7,961,618 B1 * | 6/2011 | Prasad et al. | 370/235 |
| 8,027,689 B2 * | 9/2011 | Hsieh et al. | 455/452.2 |
| 2003/0064730 A1 * | 4/2003 | Chen et al. | 455/453 |
| 2006/0153131 A1 | 7/2006 | Kang et al. | |
| 2007/0081507 A1 * | 4/2007 | Koo et al. | 370/338 |
| 2007/0153746 A1 * | 7/2007 | Lee et al. | 370/335 |
| 2007/0153758 A1 * | 7/2007 | Kang et al. | 370/338 |
| 2007/0155391 A1 | 7/2007 | Kang et al. | |
| 2007/0177545 A1 * | 8/2007 | Natarajan et al. | 370/331 |
| 2007/0189256 A1 * | 8/2007 | Oh | 370/338 |

(Continued)

FOREIGN PATENT DOCUMENTS

EP   1855492 A1 * 11/2007

(Continued)

OTHER PUBLICATIONS

Ohyun Jo, et al., "QoS provisioning uplink resource management for relay station in IEEE 802.16 based multi-hop cellular system", May 2007, 5 pages.

*Primary Examiner* — Alpus H Hsu

(57) ABSTRACT

Disclosed is a method and apparatus for allocating a bandwidth in a communication system. The method includes the steps of checking the number of mobile stations that fall within a cell under the control of an relay station and have data to be transmitted to a base station, determining a bandwidth allocation period for data transmission corresponding to the checked number of mobile stations, and transmitting a bandwidth allocation message at intervals of the determined bandwidth allocation period.

20 Claims, 4 Drawing Sheets

U.S. PATENT DOCUMENTS

| | | | |
|---|---|---|---|
| 2008/0013459 A1* | 1/2008 | Do et al. | 370/248 |
| 2008/0181168 A1* | 7/2008 | Han et al. | 370/315 |
| 2008/0188231 A1* | 8/2008 | Zhu et al. | 455/450 |
| 2008/0200195 A1* | 8/2008 | Abe et al. | 455/501 |
| 2008/0214105 A1* | 9/2008 | Hsu et al. | 455/7 |
| 2008/0316954 A1* | 12/2008 | Zheng | 370/315 |
| 2009/0197624 A1* | 8/2009 | Kwak et al. | 455/517 |
| 2009/0219852 A1* | 9/2009 | Youn et al. | 370/315 |
| 2009/0252079 A1* | 10/2009 | Zhang et al. | 370/315 |
| 2010/0046413 A1* | 2/2010 | Jin et al. | 370/315 |

FOREIGN PATENT DOCUMENTS

| | | |
|---|---|---|
| KR | 10-2006-0081308 | 7/2006 |
| KR | 10-2007-0070379 | 7/2007 |

* cited by examiner

METHOD AND SYSTEM FOR TRANSMITTING/RECEIVING DATA IN COMMUNICATION SYSTEM

CROSS-REFERENCE TO RELATED APPLICATION(S) AND CLAIM OF PRIORITY

The present application claims priority to an application entitled "Method and System for Transmitting/Receiving Data in Communication System" filed in the Korean Industrial Property Office on Jul. 16, 2007, and assigned Ser. No. 2007-0071093, the contents of which are hereby incorporated by reference.

TECHNICAL FIELD OF THE INVENTION

The present invention relates to a communication system, and more particularly to a method and system for transmitting/receiving data in a communication system employing a multi-hop relay scheme.

BACKGROUND OF THE INVENTION

In order to enable high-speed communication and accommodate a large amount of communication traffic, next generation communication systems employ a multi-hop relay scheme. The multi-hop relay scheme is a scheme for transferring data in the form of a multi-hop by using fixed or mobile relay stations (RS), and a communication system employing the multi-hop relay scheme (hereinafter referred to as "multi-hop communication system") can quickly reconfigure a network in response to a change in surrounding environments and thus can more efficiently operate the whole wireless network.

Also, the multi-hop communication system can extend service coverage and increase system capacity through a multi-hop. That is, when channel conditions between a base station (BS) and a mobile station (MS) are poor, the BS can provide the MS with a wireless channel with better conditions by configuring a multi-hop relay path by using RSs.

Meanwhile, in next generation communication systems, research has been actively conducted to provide a scheduling method for efficiently using limited resources. In order to efficiently use limited resources, not only unnecessary resource allocation must be prevented, but also already allocated resources must be quickly recovered and reallocated for other services. In addition, for efficient use of resources in data transmission/reception, fast bandwidth allocation must be made in response to a bandwidth allocation request for data transmission. A polling scheme is one of exemplary bandwidth allocation schemes.

The polling scheme is a scheme in which a BS allocates a bandwidth to an RS at regular periodic intervals. That is, since an RS is allocated a bandwidth from a BS at regular periodic intervals, it can transmit data without separately taking steps with the BS, that is, without requesting the BS to allocate a bandwidth and being allocated a bandwidth, when receiving the data from an MS.

However, the polling scheme has a problem with allocating a bandwidth at regular periodic intervals. That is, since the interval between bandwidth allocation periods is regular, resources for polling may be saved whereas a time delay lengthens when a bandwidth period is long, and a time delay may decrease whereas polling resources are wasted when a bandwidth allocation period is short. Thus, there is a problem in that it is difficult to efficiently use resources.

Therefore, in submitting a request for resource allocation and allocating a resource in response to the request, there is a need for a way to effectively allocate a bandwidth by changing a bandwidth allocation period at regular intervals according to system situations.

SUMMARY OF THE INVENTION

To address the above-discussed deficiencies of the prior art, it is a primary object to provide a method and system for submitting a request for resource allocation and allocating a resource in response to the request in a multi-hop communication system.

Further, the present invention provides a method and system for submitting a request for resource allocation by an MS and allocating a resource in response to the request by a BS in a multi-hop communication system employing a polling scheme.

Further, the present invention provides a method and system for determining a bandwidth allocation period in consideration of the number of MSs and allocating a resource at intervals of the determined bandwidth period.

In accordance with an aspect of the present invention, there is provided a method of allocating a bandwidth in a communication system, the method including the steps of checking the number of mobile stations that fall within a cell under the control of an relay station and have data to be transmitted to a base station; determining a bandwidth allocation period for data transmission in correspondence with the checked number of mobile stations; and transmitting a bandwidth allocation message at intervals of the determined bandwidth allocation period.

In accordance with another aspect of the present invention, there is provided a system for allocating a bandwidth in a communication system, the system including a period determiner for determining a bandwidth allocation period for data transmission in correspondence with the number of mobile stations that fall within a cell under the control of an relay station and have data to be transmitted to a base station; and a periodic transmitter for transmitting a bandwidth allocation message at intervals of the determined bandwidth allocation period.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method and system for transmitting/receiving data in a communication system employing a multi-hop relay scheme (multi-hop communication system).

Further, the present invention provides a method and system for submitting a resource allocation request for data transmission by a mobile station (MS) and allocating a resource in response to the request by a base station (BS) in a multi-hop communication system employing a polling scheme.

Further, the present invention provides a method and system for determining a bandwidth allocation period in consideration of the number of MSs and allocating a resource at intervals of the determined bandwidth period.

Reference will first be made to a procedure of submitting a request for resource allocation (e.g., bandwidth allocation) and allocating a bandwidth in response to the request in a multi-hop communication system employing a polling scheme according to an exemplary embodiment of the present invention, with reference to FIG. 1. For the convenience of explanation, FIG. 1 exemplifies a case where a relay station (RS) includes one MS, but the RS may include a plurality of MSs.

Figure 1:
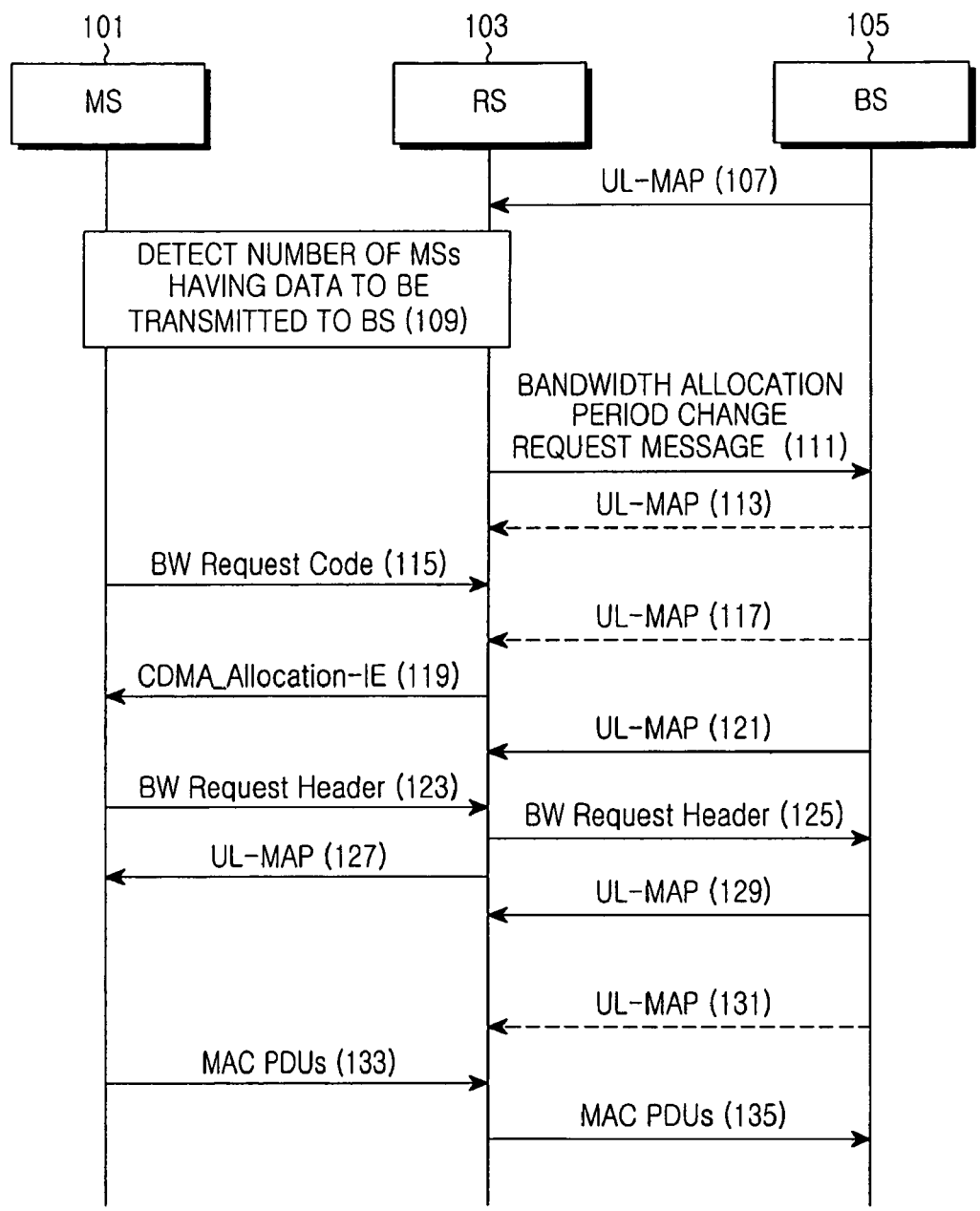
FIG. 1 is a signal flowchart illustrating a procedure of submitting a request for bandwidth allocation and allocating a bandwidth in a multi-hop communication system employing a polling scheme in accordance with an exemplary embodiment of the present invention.

FIG. 1 illustrates a procedure of submitting a request for bandwidth allocation and allocating a bandwidth in a multi-hop communication system employing a polling scheme according to an exemplary embodiment of the present invention.

Referring to FIG. 1, if there occurs data, for example, a medium access control (MAC) protocol data unit (PDU), to be transmitted from an MS 101 to a BS 105, an RS 103 detects the number of MSs falling within its coverage and having data to be transmitted to a BS 105 (step 109), and then determines a bandwidth allocation period in such a manner as to be inversely proportional to the detected number of MSs. Here, the bandwidth allocation period means a period at which the RS 103 is allocated a bandwidth from the BS 105, and a way to determine the bandwidth allocation period is as follows:

First of all, a detailed description will be given of a way for the RS 103 to determine a bandwidth allocation period in such a manner as to be inversely proportional to an increase in the number of MSs.

If the number of MSs falling within the coverage of the RS 103 and having data to be transmitted to the BS 105 increase a times, the RS 103 determines a bandwidth allocation period in such a manner as to be reduced to 1/α times. That is, the more the number of MSs falling within the coverage of the RS 103 and having data to be transmitted to the BS 105, the shorter a bandwidth allocation period.

If the value of the number (hereinafter referred to as "$N^{RT}$") of MSs falling within the coverage of RS 103 and having data to be transmitted to the BS 105, is $N_{min}^{RT}$, a bandwidth allocation period has an initial value (hereinafter referred to as "$PN_{max}$"). Here, $N_{min}^{RT}$ means the number of MSs that have data to be transmitted to the BS 105 when the BS 105 can change the initial value of an RS bandwidth allocation period. That is, if the value of $N^{RT}$ is $\alpha \times N_{min}^{NR}$, an RS bandwidth allocation period has a value of $P_{max}/\alpha$ (with the proviso that α is greater than 1). Also, if the value of $N^{RT}$ is $N_{max}^{RT}$, a bandwidth allocation period has a minimum value (hereinafter referred to as "$P_{min}$"). Here, $N_{max}^{RT}$ means the maximum number of MSs having data to be transmitted to the BS 105, acceptable by the RS 103. For example, supposing that $P_{max}$ is 12 frames, $P_{min}$ is 4 frames, $N_{min}^{RT}$ is 10, and $N_{max}^{RT}$ is 30, a bandwidth allocation period is determined in such a manner as to be reduced to 6 frames and 4 frames as the value of $N^{RT}$ increases 2 times and 3 times.

In addition to the above-mentioned scheme in which an RS bandwidth allocation period is determined in such a manner as to be inversely proportional to an increase in the number of MSs, there is another scheme in which the RS 103 determines a bandwidth allocation period according to MS number sections. Hereinafter, the scheme in which the RS 103 determines a bandwidth allocation period according to MS number sections will be described in detail.

The RS 103 divides a section between the number of MSs that have data to be transmitted to the BS 105 when the BS 105 can change the initial value of an RS bandwidth allocation period (i.e., $N_{min}^{RT}$) and the maximum number of MSs having data to be transmitted to the BS 105, acceptable by the RS 103 (i.e., $N_{max}^{RT}$) into N subsections, and then determines a bandwidth allocation period in such a manner as to be changed corresponding to the respective subsections. Here, if the value of $N^{RT}$ is $N_{max}^{RT}$, an RS bandwidth allocation period has a value of $P_{min}$, and if the value of $N^{RT}$ is $N_{min}^{RT}$, an RS bandwidth allocation period has a value of $P_{max}$. For example, supposing that $P_{max}$ is 12 frames, $P_{min}$ is 3 frames, $N_{min}^{RT}$ is 10, and $N_{max}^{RT}$ is 30, the RS 103 arbitrarily divides the section between $N_{min}^{RT}$ and $N_{max}^{RT}$ into 4 subsections, that is, a subsection ranging from 10 to 15, a subsection ranging from 16 to 20, a subsection ranging from 21 to 25, and a subsection ranging from 26 to 30, and then determines P as 12 frames (12'4/4=$P_{max}$), 9 frames (12×3/4), 6 frames (12×2/4), and 3 frames (12×¼=$P_{min}$) corresponding to the respective subsections.

Upon determining a bandwidth allocation period according to the two schemes proposed in the present invention, that is, the scheme for determining a bandwidth allocation period in such a manner as to be inversely proportional to an increase in the number of MSs falling within the coverage of the RS 103 and having data to be transmitted to the BS 105, and the scheme for determining a bandwidth allocation period according to MS number sections, the RS 103 transmits a bandwidth allocation period change request message to the BS 105 by using uplink MAP (UL-MAP) received in step 107 (step 111).

Upon receiving the bandwidth allocation period change request message, the BS 105 changes a corresponding RS bandwidth allocation period in correspondence with bandwidth allocation period information determined by the RS, which is included in the bandwidth allocation period change request message, and then transmits a bandwidth allocation message, for example, UL-MAP, to the RS 103 at intervals of the changed bandwidth allocation period (steps 113, 117, 121, and 131).

The MS 101 transmits a bandwidth request code (hereinafter referred to as "BW req code") to the RS 103 (step 115). Upon receiving the BW req code, the RS 103 transmits a code division multiple access allocation information element (hereinafter referred to as "CDMA_Allocation-IE") to the MS 101 (step 119) to thereby allocate a bandwidth necessary when the MS 101 transmits a bandwidth request header (hereinafter referred to as "BW req header") to the RS 103.

Upon receiving the CDMA_Allocation-IE and being allocated the bandwidth, the MS 101 transmits the BW req header to the RS 103 (step 123), thereby requesting the RS 103 to allocate a bandwidth necessary for transmitting MAC PDUs. Upon receiving the BW req header, the RS 103 transmits the received BW req header to the BS 105 by using the UL-MAP received in step 121 (step 125). The RS 103 also transmits UL-MAP to the MS 101 (step 127) to thereby allocate a bandwidth requested by the MS 101 in correspondence with the BW req header received in step 123. Upon receiving the BW req header in step 125, the BS 105 transmits UL-MAP to the RS 103 (step 129) to thereby allocate a bandwidth requested by the RS 103.

Upon being allocated a bandwidth from the RS 103 in step 127, the MS 101 transmits MAC PDUs to the RS 103 (step 133). Upon being allocated a bandwidth from the BS 105 in step 129 from the BS 105, the RS 103 transmits the MAC PDUs to the BS 105 (step 135).

Although FIG. 1 exemplifies one MS for the convenience of explanation, the RS may include a plurality of MSs, and thus there occurs a case where two or more MSs submit a request for bandwidth allocation by transmitting a BW req header respectively. In this case, the RS uses a bandwidth, which the BS has allocated thereto in step 107, for an MS that transmits the BW req header first received by the RS. For example, when the RS receives a BW req header from MS1 in the (n−1)th frame interval, and then receives a BW req header from MS2 in the nth frame interval, the RS first transmits the BW req header of the MS1 to the BS by using the allocated bandwidth. With regard to this, if two or more MSs simultaneously transmit BW req headers to the RS, the RS first transmits the BW req header of the MS, which submits a request to allocate a bandwidth for real-time data transmission, to the BS by using the allocated bandwidth. Also, when two or more MSs simultaneously transmit BW req headers for real-time data transmission, the RS transmits the BW req header of the MS selected in a random manner.

By way of example, FIG. 1 illustrates the procedure in which the RS 103 detects the number of MSs falling within its coverage and requesting a real-time service, and determines its own bandwidth allocation period according to the two schemes proposed in the present invention, that is, the scheme for determining a bandwidth allocation period in such a manner as to be inversely proportional to an increase in the number of MSs, and the scheme for determining a bandwidth allocation period according to MS number sections.

However, it should be noted that if the RS 103 forwards information on the number of MSs having data to be transmitted to the BS 105 and falling within the coverage of the RS 103 to the BS 105, the BS 105 may perform the above-mentioned procedure of determining a bandwidth allocation period. That is, if the RS 103 detects the number of MSs falling within its coverage and requesting a real-time service (step 109), and then transmits the detected number of MSs to the BS 105, the BS 105 determines a bandwidth allocation period corresponding to the received number of MSs by using the two schemes proposed in the present invention, that is, the scheme for determining a bandwidth allocation period in such a manner as to be inversely proportional to an increase in the number of MSs, and the scheme for determining a bandwidth allocation period according to MS number sections, and then allocates a bandwidth in correspondence with its determined bandwidth allocation period.

Figure 2:
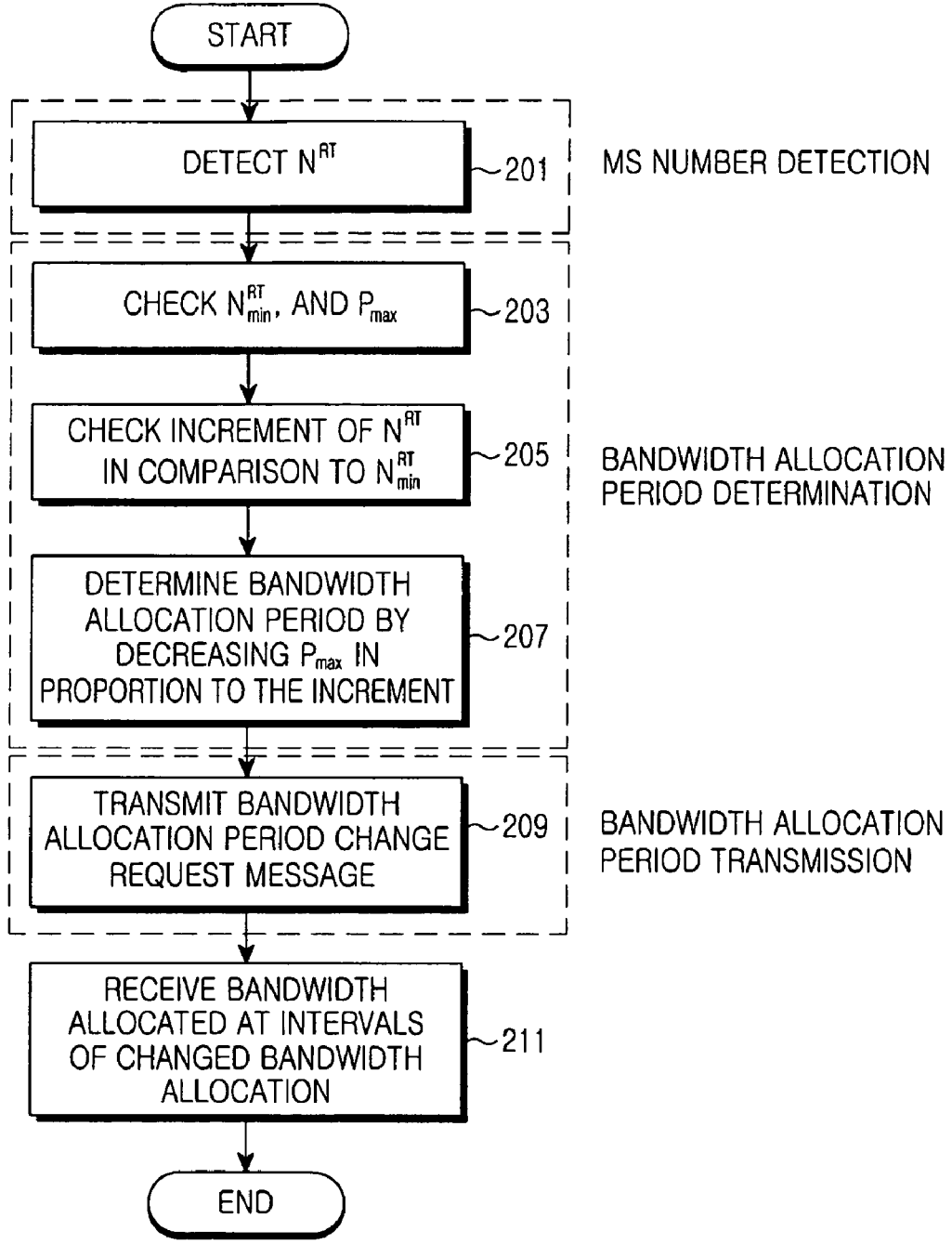
FIG. 2 is a flowchart illustrating a procedure in which an RS transmits a request for bandwidth allocation and is allocated a bandwidth in a multi-hop communication system employing a polling scheme in accordance with a first exemplary embodiment of the present invention.

Next, reference will be made to FIG. 2 illustrating a procedure in which an RS transmits a request for bandwidth allocation and is allocated a bandwidth in a multi-hop communication system employing a polling scheme according to a first exemplary embodiment of the present invention.

Referring to FIG. 2, in step 201, the RS detects the number of MSs falling within its coverage and having data to be transmitted to a BS, that is, $N^{RT}$, and then proceeds to step 203. In step 203, the RS checks the number of MSs that have data to be transmitted to the BS when the BS can change the initial value of a bandwidth allocation period, that is, $N_{min}^{RT}$, and the initial value of a bandwidth allocation period, that is, $P_{max}$, and then proceeds to step 205. In step 205, the RS checks an increment of $N^{RT}$ in comparison to $N_{min}^{RT}$, and then proceeds to step 207. In step 207, the RS determines a bandwidth allocation period by decreasing the value of $P_{max}$ in proportion to the increment, and then proceeds to step 209. In step 209, the RS transmits a bandwidth allocation period change request message for changing its bandwidth allocation period to the BS, and then proceeds to step 211. In step 211, the RS is allocated a bandwidth by receiving UL-MAP corresponding to its determined bandwidth allocation period.

In the above procedure, step 201 corresponds to a process in which the RS itself detects the number of MSs falling within its coverage and requesting a real-time service, steps 203 to 207 correspond to a process of determining a bandwidth allocation period in consideration of the number of MSs, detected by the RS, step 209 corresponds to a process in which the RS transmits its determined bandwidth allocation period to the BS, and step 211 corresponds to a process in which the RS is allocated a bandwidth in correspondence with its determined bandwidth allocation period.

Figure 3:
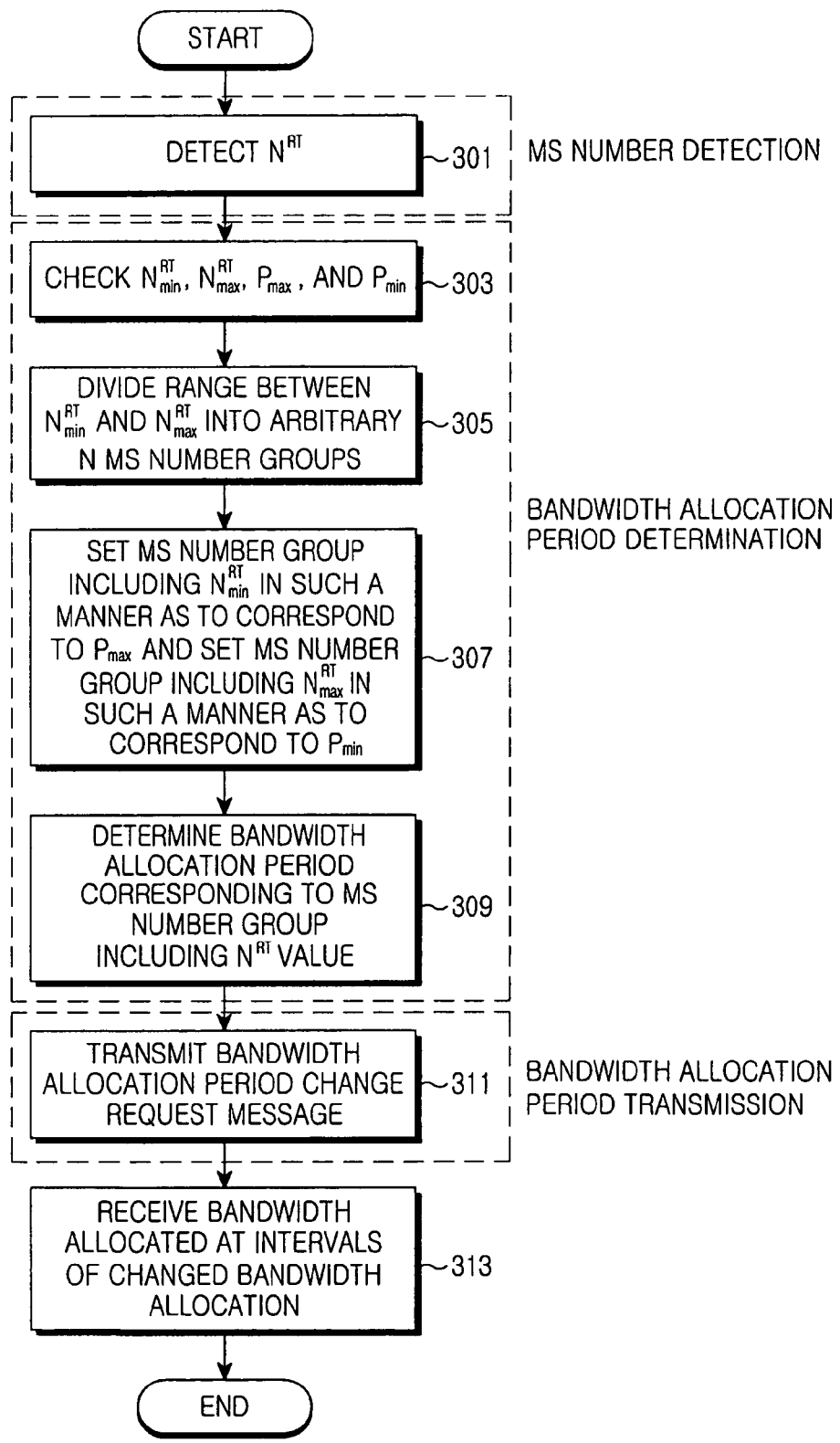
FIG. 3 is a flowchart illustrating a procedure in which an RS transmits a request for bandwidth allocation and is allocated a bandwidth in a multi-hop communication system employing a polling scheme in accordance with a second exemplary embodiment of the present invention.

Next, reference will be made to FIG. 3 illustrating a procedure in which an RS transmits a request for bandwidth allocation and is allocated a bandwidth in a multi-hop communication system employing a polling scheme according to a second exemplary embodiment of the present invention.

Referring to FIG. 3, in step 301, the RS detects the value of $N^{RT}$, and then proceeds to step 303. In step 303, the RS checks $N_{max}^{RT}$, $N_{min}^{RT}$, $P_{max}$, and $P_{min}$, and then proceeds to step 305. In step 305, the RS divides the section between $N_{max}^{RT}$ and $N_{min}^{RT}$ into arbitrary N subsections, that is, arbitrary N MS number groups, and then proceeds to step 307. In step 307, the RS sets the MS number group including $N_{min}^{RT}$ in such a manner as to correspond to $P_{max}$ and sets the MS number group including $N_{max}^{RT}$ in such a manner as to correspond to $P_{min}$, and then proceeds to step 309. In step 309, the RS determines a bandwidth allocation period corresponding to the MS number group including the $N^{RT}$ value detected in step 303, and then proceeds to step 311. In step 311, the RS transmits a bandwidth allocation period change request message for changing its bandwidth allocation period to a BS, and then proceeds to step 313. In step 313, the RS is allocated a bandwidth by receiving UL-MAP corresponding to its determined bandwidth allocation period.

Figure 4:
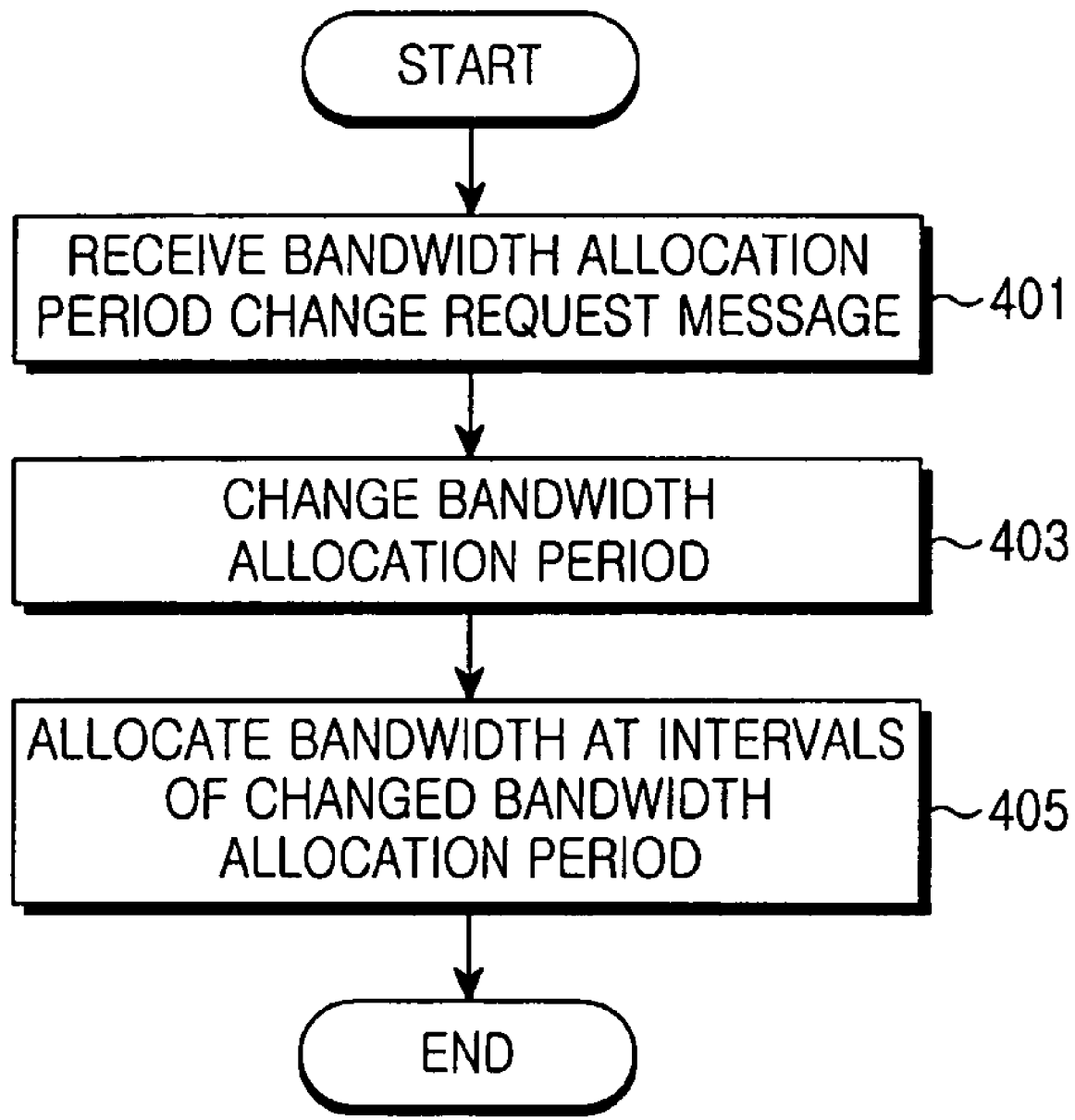
FIG. 4 is a flowchart illustrating a procedure in which a BS receives a request for bandwidth allocation and allocates a bandwidth in a multi-hop communication system employing a polling scheme in accordance with an exemplary embodiment of the present invention.

Next, reference will be made to FIG. 4 illustrating a procedure in which a BS receives a request for bandwidth allocation and allocates a bandwidth in a multi-hop communication system employing a polling scheme according to an exemplary embodiment of the present invention.

Referring to FIG. 4, in step 401, the BS receives a bandwidth allocation period change request message, and then proceeds to step 403. In step 403, the BS changes a relevant RS bandwidth allocation period in correspondence with bandwidth allocation period information included in the received bandwidth allocation period change request message, and then proceeds to step 405. In step 405, the BS allocates a bandwidth by transmitting UL-MAP at intervals of the changed bandwidth allocation period.

According to the present invention as described above, an RS changes a bandwidth allocation period according to a change in the number of MSs falling within its coverage. That is, the RS lengthens a bandwidth allocation period when the number of MSs falling within its coverage and having data to be transmitted to a BS is small, and shortens a bandwidth allocation period when the number of MSs is large, which makes it possible to efficiently use limited resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of allocating a bandwidth in a communication system, the method comprising:
   determining, at a relay station, a number of mobile stations that fall within a cell of the relay station and have data to be transmitted to a base station;
   determining, at the relay station, a bandwidth allocation period for data transmission based on the determined number of mobile stations, wherein determining the bandwidth allocation period comprises:
      when the determined number of mobile stations is greater than an existing number of mobile stations, determining the bandwidth allocation period by decreasing a previous bandwidth allocation period; and
      when the determined number of mobile stations is less than the existing number of mobile stations, determining the bandwidth allocation period by increasing the previous bandwidth allocation period; and
   receiving, at the relay station, a bandwidth allocation message according to the determined bandwidth allocation period.

2. The method as claimed in claim 1, wherein determining the bandwidth allocation period further comprises:
   when a predetermined range of the number of mobile stations is divided into a plurality of sections, and bandwidth allocation periods are specified according to the plurality of sections, selecting a section corresponding to the determined number of mobile stations from among the plurality of sections; and
   selecting a bandwidth allocation period corresponding to the selected section from among the specified bandwidth allocation periods, and selecting the selected bandwidth allocation period as the bandwidth allocation period.

3. The method as claimed in claim 1, wherein the data comprises real-time data.

4. The method as claimed in claim 1, wherein the bandwidth allocation message comprises an uplink map (UL-MAP) message.

5. The method as claimed in claim 1, further comprising:
   transmitting the determined number of mobile stations from the relay station to the base station.

6. The method as claimed in claim 1, further comprising:
   transmitting the determined bandwidth allocation period from the relay station to the base station.

7. The method as claimed in claim 1 further comprising:
   identifying a number of mobile stations falling within the cell of the relay station and request transmission of data.

8. The method as claimed in claim 1 further comprising:
   determining the bandwidth allocation period for data transmission corresponding to the number of mobile stations that fall within the cell of the relay station and have data to be transmitted to the base station from the bandwidth allocation message.

9. The method as claimed in claim 1 further comprising:
   allocating, by the base station, bandwidth by transmitting an allocation message at intervals of the determined bandwidth allocation period to the relay station.

10. The method as claimed in claim 1 further comprising:
    changing, by the base station, the bandwidth allocation period in response to receiving the bandwidth allocation message from the relay station.

11. A system for allocating a bandwidth in a communication system, the system comprising:
    a relay station configured to determine a bandwidth allocation period for data transmission based on a number of mobile stations that fall within a cell of the relay station and have data to be transmitted to a base station and receive a bandwidth allocation message according to the determined bandwidth allocation period, wherein the relay station is further configured to determine the bandwidth allocation period by decreasing a previous bandwidth allocation period when the determined number of mobile stations is greater than an existing number of mobile stations, and determine the bandwidth allocation period by increasing the previous bandwidth allocation period when the determined number of mobile stations is less than the existing number of mobile stations.

12. The system as claimed in claim 11, wherein
    when a predetermined range of the number of mobile stations is divided into a plurality of sections, and bandwidth allocation periods are specified corresponding to the plurality of sections, the relay station is further configured to select a section corresponding to the determined number of mobile stations from among the plurality of sections, select a bandwidth allocation period corresponding to the selected section from among the specified bandwidth allocation periods, and select the selected bandwidth allocation period as the bandwidth allocation period.

13. The system as claimed in claim 11, wherein the data comprises real-time data.

14. The system as claimed in claim 11, wherein the bandwidth allocation message comprises an uplink map (UL-MAP) message.

15. The system as claimed in claim 11, wherein the relay station is further configured to check the number of mobile stations falling within the cell of the relay station and request transmission of the data.

16. The system as claimed in claim 11 further comprising:
the base station configured to determine the bandwidth allocation period for data transmission corresponding to the number of mobile stations that fall within the cell of the relay station and have data to be transmitted to the base station from the bandwidth allocation message received from the relay station.

17. The system as claimed in claim 11 further comprising:
the base station configured to allocate bandwidth by transmitting an allocation message at intervals of the determined bandwidth allocation period to the relay station.

18. The system as claimed in claim 11 further comprising:
the base station configured to change the bandwidth allocation period in response to receiving the bandwidth allocation message from the relay station.

19. The system as claimed in claim 11, wherein the relay station is further configured to transmit the determined number of mobile stations to the base station.

20. The system as claimed in claim 11, wherein the relay station is further configured to transmit the determined bandwidth allocation period to the base station.

* * * * *